United States Patent Office 3,280,210
Patented Oct. 18, 1966

3,280,210
DEHYDROGENATION OF PARAFFINS USING MOLYBDENUM SULFIDE-ALUMINA CATALYST
Marvin M. Johnson and Harold J. Hepp, Bartlesville, Okla., assignors to Phillips Petroleum Company, a corporation of Delaware
No Drawing. Filed Sept. 8, 1964, Ser. No. 395,076
17 Claims. (Cl. 260—683.3)

This invention relates to an improved catalyst and process for dehydrogenating paraffin hydrocarbons to olefins.

The abundance of relatively low molecular weight paraffins such as $C_2$–$C_{12}$ paraffin hydrocarbons and the demand for the corresponding olefin hydrocarbons has led to the development of various processes for dehydrogenating the paraffins to the olefin hydrocarbons. These processes utilize various metal oxides, particularly, Group VIB metal oxides deposited on or admixed with alumina as the catalyst in the process. The yields and the conversion rate have not been entirely satisfactory for an economical conversion process and various improvements have been made in this type of process. Carbon monoxide has been utilized as a hydrogen acceptor in paraffin dehydrogenation with the oxide catalyst, resulting in some improvement therein. Also, the metal oxide-alumina catalyst has been treated to incorporate an alkali metal oxide therein. This also has resulted in some improvement in the process. Even with these improvements, paraffin dehydrogenation in the present state of art results in paraffin conversion and olefin yield which leave considerable room for improvement.

The present invention is concerned with an improved process for paraffin dehydrogenation which provides higher conversion and olefin yield than presently known processes.

Accordingly, the principal object of the invention is to provide an improved catalyst and process for dehydrogenating paraffin hydrocarbons to the corresponding olefin hydrocarbons. Another object is to provide a process for paraffin dehydrogenation which utilizes a novel catalyst in the reaction. Other objects of the invention will become apparent to one skilled in the art upon consideration of the accompanying disclosure.

A broad aspect of the invention comprises dehydrogenating a $C_2$–$C_{12}$ paraffin hydrocarbon in admixture with carbon monoxide under dehydrogenation conditions in contact with a catalyst consisting essentially of a sulfide or alkali-treated sulfide of at least one of the metals of the group Cr, Mo, and W in admixture with active alumina. The dehydrogenation process utilizing the metal sulfide instead of the metal oxide can be effected at a lower temperature and a higher pressure than can be used in conventional dehydrogenation with the corresponding oxide catalyst, and the paraffin conversion and olefin yield are both considerably higher than with conventional Group VIB oxide catalysts under the same conditions. The advantages of using carbon monoxide as a hydrogen acceptor in paraffin dehydrogenation includes (1) no volume change occurs and the process is relatively insensitive to pressure; (2) the process is slightly exothermic rather than highly endothermic, thereby minimizing heat requirement and heat transfer problems; and (3) the thermodynamic conversion ceiling is higher at temperature below 1200° F., thereby permitting the use of lower temperature operation.

The sulfide catalysts of the invention are prepared by means known to the industry and include coprecipitation, impregnation, dry or wet blending, and the like. When the oxides are used or formed in the process of preparation, a subsequent treatment with hydrogen sulfide under sulfiding conditions is required. When sulfides are used or formed in the process of preparation, no further treatment prior to dehydrogenation is necessary. The optional advantageous alkali treatment can be effected as part of the original catalyst preparation, by treatment of the finished catalyst prior to using, or by in situ treatment of the catalyst with steam into which the desired amount of a solution of an alkaline reagent (such as sodium hydroxide, potassium hydroxide, potassium carbonate, and similar compounds) is injected. The finished catalyst contains 2 to 50, preferably 5 to 35 weight percent metal sulfide, and 0.1 to 5.0, preferably 0.5 to 2.5 weight percent alkaline reagent. Molybdenum sulfide is the preferred metal sulfide.

The broad and preferred operating conditions for the process of the invention are set forth below:

|  | Broad | Preferred |
| --- | --- | --- |
| Hydrocarbon flow, LHSV | 0.1–50 | 0.25–20 |
| CO/Hydrocarbon, mol ratio | 0.05–5 | 0.1–2 |
| Pressure, p.s.i.g | 0–1,000 | 250–750 |
| Temperature, °F | 500–1,500 | 750–1,000 |

Certain catalysts were used in runs demonstrating the process of the invention as applied to the dehydrogenation of propane which is illustrative of paraffin dehydrogenation. These catalysts were either obtained commercially or prepared by treatment of a commercially obtained catalyst. The catalysts used in the runs are set forth below:

*Run 1.*—The catalyst was prepared by treating a portion of catalyst similar to that used in Run 2 with sufficient aqueous solution of potassium hydroxide to deposit one weight percent potassium hydroxide. It was used in the form of $\frac{1}{8}''$ pellets. The approximate analysis in weight percent was: 1 KOH–20 $MoS_3$–79 $Al_2O_3$.

*Run 2.*—The catalyst was prepared by the Girdler Catalyst Division of Chemetron Chemicals, a division of Chemetron Corporation. It was used in the form of $\frac{1}{8}$-inch pellets. The analysis in weight percent was: 20 $MoS_3$–80 $Al_2O_3$.

*Run 3.*—The catalyst was prepared by Houdry Processes and Chemicals, a division of Air Products and Chemicals, Inc. It was used in the form of 10 to 20 mesh granules. The analysis in weight percent was: 10 $MoO_3$–90 $Al_2O_3$.

The propane dehydrogenation was effected under the following conditions and with the following results:

TABLE

| Run No | 1 | 2 | 3 |
| --- | --- | --- | --- |
| Propane flow, LHSV | 0.35 | 1.93 | 1.50 |
| CO/$C_3H_8$, mol ratio | 1.70 | 0.11 | 0.21 |
| Pressure, p.s.i.g | 465 | 465 | 400 |
| Temp., avg., °F | 910 | 892 | 875 |
| Effluent analysis, wt. percent: | | | |
| $CO+CH_4+H_2$ | 51.54 | 7.31 | 9.00 |
| $C_2H_4+C_2H_6$ | 3.36 | 0.58 | 1.14 |
| $CO_2$ | 4.60 | 1.11 | 0.98 |
| $C_3H_6$ | 9.95 | 4.80 | 0.45 |
| $C_3H_8$ | 30.53 | 86.20 | 88.50 |
| | 99.98 | 100.07 | 100.00 |
| Based on 100 lb. $C_3H_8$ feed: | | | |
| $C_3H_8$ converted, lb | 36.4 | 8.0 | |
| $C_3H_6$ made, lb | 20.8 | 5.1 | (a) |
| $C_3H_6$ ultimate yield, wt. percent | 57.2 | 63.7 | | a Figures are so low as to be meaningless.

The data in the preceding table show that propane conversions and propylene yield are very poor with a molybdena-alumina catalyst (Run 3), good with a molybdenum sulfide-alumina (Run 2), and excellent with an alkali-treated molybdenum sulfide-alumina catalyst (Run 1).

The dehydrogenation of propane is believed representative of the dehydrogenation of $C_2$–$C_{12}$ paraffin hydrocarbons and it is to be understood that corresponding results are obtained in the dehydrogenation of ethane, butane, pentane, hexane, n-dodecane, etc. It is also to be understood that mixtures of these various paraffin hydrocarbons may be dehydrogenated under similar conditions. Of course, it is known that the heavier paraffins in this group may be dehydrogenated at lower temperatures than the lower members of the series and when dehydrogenating a mixture thereof, the optimum temperature for conversion will be a compromise between the temperatures most suitable for the individual dehydrogenation of the members of the mixture.

Certain modifications of the invention will become apparent to those skilled in the art and the illustrative details disclosed are not to be construed as imposing unnecessary limitations on the invention.

We claim:

1. A process for dehydrogenating a $C_2$ to $C_{12}$ paraffin hydrocarbon to an olefin hydrocarbon which comprises contacting said paraffin hydrocarbon under dehydrogenating conditions with a catalyst consisting essentially of a metal sulfide of the group consisting of the sulfides of Cr, Mo, and W and mixtures thereof on alumina in admixture with carbon monoxide as a hydrogen acceptor so as to produce an olefin hydrocarbon and recovering said olefin hydrocarbon.

2. The process of claim 1 wherein said catalyst has a minor but effective amount of an alkali metal hydroxide.

3. The process of claim 2 wherein said amount is in the range of about 0.1 to 5.0 weight percent of the catalyst.

4. The process of claim 1 wherein the amount of molybdenum sulfide is in the range of 2–50 weight percent of said catalyst.

5. The process of claim 1 wherein said paraffin hydrocarbon is propane.

6. The process of claim 1 wherein the metal sulfide is molybdenum sulfide.

7. The process of claim 6 wherein said catalyst includes a minor but effective amount of an alkali metal hydroxide.

8. A process for dehydrogenating a $C_2$ to $C_{12}$ paraffin hydrocarbon to an olefin which comprises contacting said hydrocarbon in admixture with carbon monoxide at a mol ratio of CO to hydrocarbon in the range of 0.1 to 2 in contact with a catalyst consisting essentially of a metal sulfide of the group consisting of the sulfide of Cr, Mo, and W and mixtures thereof and an alkali metal hydroxide in admixture with active alumina, the amount of the metal sulfide being in the range of about 5 to 35 weight percent of the catalyst and the alkali metal compound being in the range of about 0.5 to 2.5 weight percent of the catalyst, at a hydrocarbon flow rate in the range of about 0.25 to 20 LHSV, a pressure in the range of about 250–270 p.s.i.g, and a temperature in the range of about 750 to 1000° F. so as to produce said olefin, and recovering the olefin as a product of the process.

9. The process of claim 8 wherein said hydrocarbon is propane

10. The process of claim 8 wherein said hydrocarbon is ethane.

11. The process of claim 8 wherein said hydrocarbon is butane.

12. The process of claim 8 wherein said hydrocarbon is pentane.

13. The process of claim 8 wherein said metal sulfide is molybdenum sulfide.

14. The process of claim 13 wherein the hydrocarbon feed is principally propane.

15. A catalyst consisting essentially of a metal sulfide of the group consisting of the sulfides of Cr and W and mixtures thereof in the range of 2 to 50 weight percent, an alkali metal hydroxide in the range of 0.1 to 5.0 weight percent, and alumina, said alumina comprising the balance.

16. The catalyst of claim 15 wherein said metal sulfide is chromium sulfide in an amount in the range of 5 to 35 weight percent of the catalyst.

17. The catalyst of claim 15 wherein said metal sulfide is tungsten in an amount in the range of 5 to 35 weight percent of the catalyst.

References Cited by the Examiner

UNITED STATES PATENTS

| | | | |
|---|---|---|---|
| 2,490,488 | 12/1949 | Stewart | 252—439 |
| 2,686,763 | 8/1954 | Johnson et al. | 252—439 |
| 2,753,310 | 7/1956 | Riedl | 252—439 |

DELBERT E. GANTZ, *Primary Examiner.*

G. E. SCHMITKONS, *Assistant Examiner.*

UNITED STATES PATENT OFFICE
CERTIFICATE OF CORRECTION

Patent No. 3,280,210　　　　　　　　　　　　　　　October 18, 1966

Marvin M. Johnson et al.

It is hereby certified that error appears in the above numbered patent requiring correction and that the said Letters Patent should read as corrected below.

Column 4, line 9, for "250-270 p.s.i.g," read -- 250-750 p.s.i.g. --.

Signed and sealed this 7th day of November 1967.

(SEAL)
Attest:

Edward M. Fletcher, Jr.　　　　　　　　　　　　　EDWARD J. BRENNER
Attesting Officer　　　　　　　　　　　　　　　　Commissioner of Patents